United States Patent [19]
Peascoe et al.

[11] Patent Number: 5,338,797
[45] Date of Patent: Aug. 16, 1994

[54] POLYETHERIMIDE ESTER ELASTOMERIC COMPOSITIONS

[75] Inventors: Warren J. Peascoe, WestStockbridge, Mass.; John A. Tyrell, Williamsville, N.Y.

[73] Assignee: General Electric Company, Pittsfield, Mass.

[21] Appl. No.: 63,101

[22] Filed: May 14, 1993

Related U.S. Application Data

[63] Continuation of Ser. No. 546,654, Jun. 28, 1990, abandoned, which is a continuation of Ser. No. 152,524, Feb. 5, 1988, abandoned.

[51] Int. Cl.$^5$ .............................................. C08L 71/04
[52] U.S. Cl. ........................................ 525/66; 525/902
[58] Field of Search .............................................. 525/66

[56] References Cited

U.S. PATENT DOCUMENTS

| | | | |
|---|---|---|---|
| 3,944,631 | 3/1976 | Yu et al. | 260/881 |
| 4,556,705 | 12/1985 | McCready | 528/289 |
| 4,639,486 | 1/1987 | Liu | 524/409 |
| 4,681,915 | 7/1987 | Bates et al. | 525/148 |
| 4,684,696 | 8/1987 | Bates et al. | 525/68 |

OTHER PUBLICATIONS

Narkis, M. et al., "Properties and Structure of Elastomeric Two-Stage Emulsion Interpenetrating Networks," *Polymer*, 1985, vol. 26, Aug. (Conference Issue), pp. 1359–1364.

*Primary Examiner*—Ana L. Carrillo

[57] ABSTRACT

Copolyetherimide ester thermoplastic elastomers having low modulus can be improved with respect to modulus and tensile properties by incorporation therein of certain effective multistage, rubbery interpolymers comprising a crosslinked (meth) acrylate phase and an interpenetrating, crosslinked styrenic phase.

7 Claims, No Drawings

POLYETHERIMIDE ESTER ELASTOMERIC COMPOSITIONS

This is a continuation of copending application Ser. No. 07/546,654 filed on Jun. 28, 1990 now abandoned which is a continuation of Ser. No. 07/152,524, filed on Feb. 5, 1988.

FIELD OF THE INVENTION

Elastomeric blends of copolyetherimide ester in combination with a multistage elastomer comprised of a crosslinked alkyl acrylate phase which is interpenetrated by a crosslinked styrenic phase exhibit improved physical properties such as tensile properties.

BACKGROUND OF THE INVENTION

Thermoplastic elastomers of the type known as polyetherimide esters provide a variety of unique and excellent properties and are particularly useful in extrusion and molding applications.

Polyetherimide esters prepared from diols, dicarboxylic acids and polyoxyalkylene diimide diacids are thermoplastic elastomers having an excellent combination of stress-strain properties, low tensile set, high melting temperatures and excellent strength, toughness and flexibility properties. All of these properties are variously useful in many elastomer applications. Polyetherimide esters also process well, due to their rapid crystallization rate and excellent moldability characteristics. Elastomers with the low flexural modulus of polyetherimide esters in combination with any of the aforementioned advantageous properties have gained wide acceptance in the field of thermoplastic elastomers.

Nonetheless it has now been found that polyetherimide esters can be improved or enhanced for certain applications, especially with respect to improving the "softness" (i.e., lower durometer) of the elastomer, while retaining satisfactory tensile properties.

The improvements are accomplished by the incorporation of effective amounts of certain rubber modifiers of the type known as multistage interpolymers. It is further surprising, however, that elastomeric blends incorporating the selected rubber modifiers can be processed to avoid the delamination or phase separation (or so-called "cheesiness") expected for the combination of thermoplastic elastomers and typical rubber products.

In particular it has been found that copolyetherimide ester elastomers can be improved by incorporation of effective amounts of rubber modifiers characterized as a multi-stage, or sequentially produced interpolymer product, specifically a thermoplastic elastomer comprised of a crosslinked polyacrylate rubbery phase which is interpenetrated by a crosslinked styrenic phase. This multistage interpolymer elastomer has been extruded to provide a rubber product, and has been added to thermoplastic resins as an impact strength improving additive. See, for example, U.S. Pat. application Ser. No. 064,892, filed Jun. 19, 1987 and which is incorporated by reference.

It has now been surprisingly found that effective amounts of the aforementioned multistage polymer modifier can be combined with a rubbery polyetherimide ester elastomer product and which will thereby exhibit improved modulus and tensile properties as mentioned above.

SUMMARY OF THE INVENTION

A thermoplastic elastomer composition is provided comprising the combination of a polyetherimide ester copolymer and a modulus reducing amount of a rubbery, multistage interpolymer modifier. A modulus reducing amount of modifier refers to the effectiveness of the interpolymer modifier for improving the softness of the polyetherimide ester elastomer.

In particular, the copolyetherimide ester is the reaction product of (a) one or more low molecular weight diols; (b) one or more dicarboxylic acids; and (c) one or more polyoxyalkylene diimide diacids.

In preferred copolyetherimide ester elastomers the diol component (a) will be 60 to 100 mole percent 1,4-butanediol; and the dicarboxylic acid component (b) will be 60 to 100 mole percent dimethyl terephthalate. Preferred polyoxyalkylene diimide diacids are discussed in detail below.

The rubbery, multistage interpolymer modifier is comprised of a crosslinked acrylate rubbery phase and an interpenetrating crosslinked styrenic resin phase. The two phases, produced in sequential fashion, maintain integrity as a result of the crosslinking of the interpenetrating polymer chains. As a consequence, it is not necessary to graft the second phase onto the first although such a grafting step could be utilized if desired. The exact structure of the multistage interpolymer is not known but a reasonable conjecture maintains that a core of crosslinked acrylate rubber is formed in the first step which is then surrounded and interpenetrated by styrenic resin, which is crosslinked thereby forming the integral multistage interpolymer. Whether this crosslinked styrenic phase forms a complete or discontinuous "shell" around the core depends on reaction conditions as well as quantities of polymer utilized.

The rubber acrylate used in the first stage is preferably an alkyl or alkoxy acrylate, hereinafter referred to as (meth) acrylate. Of these, butyl acrylate is preferred.

The styrenic resin used in the second stage of the interpolymer is preferably polystyrene although copolymers and substituted styrenes may also be utilized. For example, vinyl-type monomers such as acrylonitrile may be utilized depending upon the final use for the product. In such instance the second stage can be a crosslinked styrene-acrylonitrile copolymer (SAN).

Filled compositions, incorporating clay, silica, talc, chopped glass and the like can also be provided depending on the desired final properties of the polyetherimide ester and interpolymer combination.

DESCRIPTION

The polyetherimide esters used herein may be prepared from one or more diols, one or more dicarboxylic acids and one or more high molecular weight polyoxyalkylene diimide diacids. Preparation of such materials is described in detail in U.S. Pat. No. 4,556,705 of R.J. McCready, issued Dec. 3, 1985 and hereby incorporated by reference.

The poly(etherimide esters) used herein may be prepared by conventional processes, such as esterification and condensation reactions for the production of polyesters, to provide random or block copolymers. Thus, polyetherimide esters may be generally characterized as the reaction product of the aforementioned diols and acids.

Preferred compositions encompassed by the present invention may be prepared from (a) one or more $C_2$–$C_{15}$ aliphatic or cycloaliphatic diols, (b) one or more $C_4$–$C_{16}$ aliphatic, cycloaliphatic or aromatic dicarboxylic acids or ester derivatives thereof and (c) one or more polyoxyalkylene diimide diacids. The amount of polyoxyalkylene diimide diacid employed is generally dependent upon the desired properties of the resultant polyetherimide ester. In general, the weight ratio of polyoxyalkylene diimide diacid (c) to dicarboxylic acid (b) is from about 0.2 5 to 2.0, preferably from about 0.4 to about 1.4.

Suitable diols (a) for use in preparing the compositions of the present invention include saturated and unsaturated aliphatic and cycloaliphatic dihydroxy compounds as well as aromatic dihydroxy compounds. These diols are preferably of a low molecular weight i.e. having a molecular weight of about 250 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as for example ethylene oxide or ethylene carbonate for ethylene glycol.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, based on the total diol content, be the same diol, most preferably at least 80 mole %. As mentioned above, the preferred compositions are those in which 1,4-butanediol is present in a predominant amount, most preferably when 1,4-butanediol is the only diol.

Dicarboxylic acids (b) which are suitable for use in the practice of the present invention are aliphatic, cycloaliphatic, and/or aromatic dicarboxylic acids. These acids are preferably of a low molecular weight, i.e., having a molecular weight of less than about 300; however, higher molecular weight dicarboxylic acids, especially dimer aeids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester-forming derivativest such as acid halides and anhydrides. The molecular weight preference, mentioned above, pertains to the acid and not to its equivalent ester or ester-forming derivative.

Preferred dicarboxylic acids for the preparation of the polyetherimide esters of the present invention are the aromatic dicarboxylic acids, mixtures thereof and mixtures of one or more dicarboxylic acids with an aliphatic or cycloaliphatic dicarboxylic acid, most preferably the aromatic dicarboxylic acids. Among the aromatic acids, those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (b) be of the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

Polyoxyalkylene diimide diacids (c) suitable for use herein are high molecular weight diimide diacids wherein the average molecular weight is greater than about 700, most preferably greater than about 900. They may be prepared by the imidization reaction of one or more tricarboxylic acid compounds containing two vicinal carboxyl groups or an anhydride group and an additional carboxyl group which must be esterifiable and preferably is nonimidizable with a high molecular weight polyoxylalkylene diamine. The polyoxyalkylene diimide diacids and processes for the preparation are more fully disclosed in copending U.S. Pat. application Ser. No. 665,192, filed Oct. 26, 1984 entitled "High Molecular Weight Diimide Diacids and Diimide Diesters of Tricarboxylic Anhydrides", incorporated herein by reference.

In general, the polyoxyalkylene diimide diacids useful herein may be characterized by the following formula:

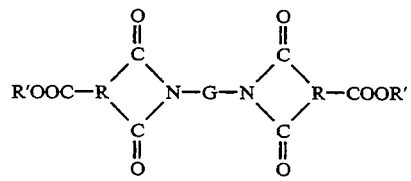

wherein each R is independently a trivalent organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g. phenyl, most preferably hydrogen; and G is the radical remaining after the removal of the terminal(or as nearly terminal as possible)hydroxy groups of a long chain ether glycol having an average molecular weight of from about 600 to about 12000, preferably from about 900 to about 4000, and a carbon-to-oxygen ratio of about 1.8 to about 4.3.

Representative long chain ether glycols from which the polyoxyalkylene diamine is prepared include poly-(ethylene ether)glycol; poly(propylene ether) glycol; poly(tetramethylene ether)glycol; random or block copolymers of ethylene oxide and propylene oxide, including propylene oxide terminated poly(ethylene ether)glycol; and random or block copolymers cf tetrahydrofuran with minor amounts of a second monomer such as methyl tetrahydrofuran (used in proportion such that the carbon-to-oxygen mole ratio in the glycol does not exceed about 4.3). Especially preferred poly-(alkylene ether)glycols are poly(propylene ether) glycol and poly (ethylene ether) glycols end capped with poly(propylene ether)glycol or propylene oxide.

In general, the polyoxylalkylene diamines useful within the scope of the present invention will have an average molecular weight of from about 600 to 12000, preferably from about 900 to 4000.

The tricarboxylic component may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially nonimidizable.

The tricarboxylic acid materials can be characterized by the following formula:

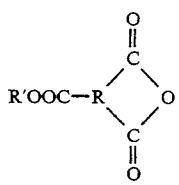

where R is a trivalent organic radical, preferably a $C_2$ to $C_{20}$ aliphatic, aromatic, or cycloaliphatic trivalent organic radical and r' is preferably hydrogen or a monovalent organic radical preferably selected from the group consisting of $C_1$ to $C_6$ aliphatic or cycloaliphatic radicals and $C_6$ to $C_{12}$ aromatic radicals, e.g. phenyl; most preferably hydrogen. A preferred tricarboxylic component is trimellitic anhydride.

Briefly, these polyoxyalkylene diimide diacids may be prepared by known imidization reactions including melt synthesis or by synthesizing in a solvent system. Such reactions will generally occur at temperatures of from 100 degrees C. to 300 degrees C., preferably at from about 150 degrees C. to about 250 degrees C. while drawing off water or in a solvent system at the reflux temperature of the solvent or azeotropic (solvent) mixture.

Although the weight ratio of the above ingredients is not critical, it is preferred that the diol be present in at least a molar equivalent amount, preferably a molar excess, most preferably at least 150 mole % based on the moles of dicarboxylic acid (b) and polyoxylalkylene diimide diacid (c) combined. Such molar excess of diol will allow for optimal yields, based on the amount of acids, while accounting for the loss of diol during esterification/condensation.

Further, while the weight ratio of dicarboxylic acid (b) to polyoxylalkylene diimide diacid (c) is not critical to form the polyetherimide esters used in the present invention, preferred compositions are those in which the weight ratio of the polyoxyalkylene diimide diacid (c) to dicarboxylic acid (b) is from about 0.25 to about 2, preferably from about 0.4 to about 1.4. The actual weight ratio employed will be dependent upon the specific polyoxyalkylene diimide diacid used and more importantly, the desired physical and chemical properties of the resultant polyetherimide ester. In general, the lower the ratio of polyoxyalkylene diimide diester to dicarboxylic acid the better the strength, crystallization and heat distortion properties of the polymer. Alternatively, the higher the ratio, the better the flexibility, tensile set and low temperature impact characteristics.

In preferred embodiments, the polyetherimide ester product will comprise the reaction product of dimethylterephthalate, optimally with up to 40 mole % of another dicarboxylic acid; 1,4-butanediol, optionally with up to 40 mole % of another saturated or unsaturated aliphatic or cycloaliphatic diol; and a polyoxyalkylene diimide diacid prepared from a polyoxylalkylene diimine of molecular weight of from about 600 to about 12000, preferably from about 900 to 4000, and trimellitic anhydride. In its most preferred embodiments, the diol will be 100 mole % 1,4-butanediol and the dicarboxylic acid 100 mole % dimethylterephthalate.

The polyetherimide esters described herein may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, herein incorporated by reference. Additionally, these compositions may be prepared by such processes and other known processes to effect random copolymers, block copolymers or hybrids thereof wherein both random and block units are present.

It is customary and preferred to utilize a catalyst in the process for the production of the polyetherimide esters of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters of salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include, zinc acetate, calcium acetate and combinations thereof with antimony tri-oxide and the like. These catalysts as well as additional useful catalysts are described in U.S. Pat. Nos. 2,465,319; 2,534,0238; 2,850,483; 2,892,8715; 2,937,160; 2,998,412; 3,047,539; 3,110,693 and 3,385,830, among others, incorporated herein by reference.

Where the reactants and reactions allow, it is preferred to use the titanium catalysts including the inorganic and organic titanium containing catalysts, such as those described in, for example, U.S. Pat. Nos. 2,720,502; 2,727,881; 2,729,619; 2,822,348; 2,906,737; 3,047,515; 3,056,817; 3,056,818; and 3,075,952 among others, incorporated herein by reference. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as for example, zinc acetate, manganese acetate or antimony trioxide, and/or with a catalyst quencher as described above.

Although these polyetherimide esters possess many desirable properties, it is often preferred to stabilize the compositions to heat, oxidation, radiation by UV light and the like, as described in the aforementioned U.S. Pat. No. 4,556,705.

The multistage, interpolymer modifiers of the present invention are those having a crosslinked (meth)acrylate rubbery phase, preferably butyl acrylate. Associated with this crosslinked rubbery phase is a phase comprised of crosslinked styrenic resin, preferably styrene, which interpenetrates the crosslinked rubbery phase. Incorporation of small amounts of other monomers such as acrylonitrile or (meth)acrylonitrile within the resin also provides products within the scope of this invention. The interpenetrating network is provided when the monomers forming the resin phase are polymerized and crosslinked in the presence of the previously polymerized and crosslinked (meth)acrylate rubbery phase.

The interpolymer compositions may be formed by the following two-step, sequential polymerization process:

1. emulsion polymerizing an acrylate monomer charge of at least one $C_2$–$C_{10}$ alkyl or alkoxyalkyl acrylate, $C_8$–$C_{12}$ alkyl or alkoxyalkyl methacrylate, or compatible mixtures thereof (all of which may be referred to as (meth) acrylate), in an aqueous polymerization medium in the presence of an effective amount of a suitable di or polyethyleneically unsaturated crosslinking agent for such type of monomer, with the $C_4$–$C_8$ alkyl or alkoxyalkyl acrylates being the preferred acrylate monomers for use in this step;

2. emulsion polymerizing a monomer charge of styrene or styrene/(meth)acrylonitrile in an aqueous polymerization medium, also in the presence of an effective amount of a suitable di or polyethyleneically unsaturated crosslinking agent for such monomers, said polymerization being carried out in the presence of the product from Step 1 so that the crosslinked (meth)acrylate and crosslinked vinyl aromatic, e.g., styrene or styrene/(meth)acrylonitrile components from an interpolymer wherein the respective phases interpenetrate one another.

The final multistage rubbery product that is formed thereby can be isolated and dried.

In greater detail, in conducting the aqueous emulsion polymerization step leading to the preparation of the crosslinked (meth)acrylate rubbery phase, there is preferably first prepared a monomer charge comprising an aqueous mixture containing about 10 to 50 percent by weight, of one or more monomers, the identity of which will be described in detail hereinbelow and from about 0.2 to 2.0 percent weight of the monomer mixture, of a water-soluble catalyst, such as ammonium, sodium or potassium persulfate, hydrogen peroxide or a redox system, such as a mixture of a persulfate with an alkali metal bisulfite, thiosulfate or hydrosulfite. The mixture is then heated at a temperature of from about 40 degrees to 95 degrees C. for a period of about 0.5 to about 8 hours.

The (meth)acrylic elastomer phase comprises crosslinked(meth)acrylic polymers or copolymers having a Tg, i.e., a glass transition temperature, of less than about 25 degrees C. These can be polymerized by means of free radical initiated emulsion techniques. These (meth) acrylic elastomer polymers should be crosslinked so that they can retain their integrity during subsequent polymer processing steps. This crosslinking can be achieved during the polymerization of the elastomer if a polyfunctional ethyleneically unsaturated monomer is included in the polymerization recipe. As used in this disclosure, the term "crosslinked" denotes a polymer which at ambient temperatures is substantially insoluble in such organic solvents as tetrahydrofuran or cyclohexanone.

Examples of (meth)acrylic elastomers that can be used include the crosslinked polymers of the $C_2$–$C_{10}$ alkyl acrylate and the $C_8$–$C_{12}$ alkyl methacrylate monomers, preferably the $C_2$–$C_8$ alkyl acrylates, such as poly(n-butyl acrylate), poly(ethyl acrylate) and poly(2-ethylhexylacrylate). At least one acrylate monomer is utilized in this step. If desired, the monomer charge may contain small amounts, i.e., 1 to 20 percent by weight of the amount of acrylate monomer, of optional monomers including styrene, acrylonitrile, methacrylonitrile, methyl methacrylate, methacrylic acid, acrylic acid, vinylidene chloride, vinyl toluene and any other ethyleneically unsaturated monomer copolymerizable with the acrylate monomer selected for use. Special mention is made of alkoxyalkyl (meth)acrylates, specifically ethoxyethyl and methoxymethyl (meth)acrylates, and acrylonitrile which will improve oil resistance while maintaining a low Tg.

In order to crosslink the (meth)acrylate monomer, from about 0.05 to about 10, preferably 0.1 to 5 percent by weight based on the weight of acrylate monomer, of at least one crosslinking agent is used. This crosslinking agent is for the purposes of this invention a di or polyfunctional ethyleneically unsaturated monomer having at least one vinyl group of the formula:

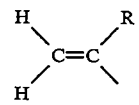

wherein R is hydrogen or lower alkyl. As is well known in the art the vinyl groups on the crosslinking monomer can be the same, e.g., divinyl benzene, trimethylolpropane triacrylate, etc., or different, e.g. allyl methacrylate, diallyl fumarate, diallyl maleate, etc. Examples of other suitable crosslinking monomers which are known to persons in the art and which can be used are triethylene glycol dimethacrylate, ethylene glycol dimethacrylate, tetraethylene glycol dimethacrylate, polyethylene glycol dimethacrylate, 1,3-butylene glycol diacrylate, 1,4-butanediol diacrylate, diethylene glycol diacrylate, diethylene glycol dimethacrylate, 1,6-hexanediol diacrylate, 2,2-dimethylpropane 1,3-diacrylate, triallyl isocyanurate, divinyl benzene, pentaerythritol tetramethacrylate, dipentaerythritol monohydroxy-penta-acrylate, pentaerythritol triacrylate, ethoxylated trimethylolpropane triacrylate, polyethylene glycol diacrylate, tetraathylene glycol diarylate, pentaerythritol tetraacrylate, 1,3-butylene glycol dimethacrylate, tripropylene glycol diacrylate, ethoxylated bisphenol A dimethyacrylate, ethoxylated bisphenol A diacrylate, trimethylolpropane triacrylate, trimethylolpropane trimethacrylate, mixtures of any of the foregoing, and the like.

Optimum results are obtained by the use of a crosslinked copolymer containing from abut 95 to about 99.9 percent by weight of n-butyl acrylate and from about 0.1 to about 5 percent by weight, of butylene glycol diacrylate.

The emulsifier which is used is at least one of the following conventional types: an anionic emulsifier, e.g., the $C_2$–$C_{22}$ carboxylic acids, the sulfates or, sulfonates of $C_6$–$C_{22}$ alcohols or allyl phenols; a non-ionic emulsifier, e.g., the addition products of alkylene oxides to fatty acids, amines or amides; a combination of the foregoing anionic and non-ionic emulsifiers; or the cationic emulsifiers, e.g., a quarternary ammonium containing compound. The amount of emulsifier should be present from about 0.5 to about 5 percent by weight in the emulsion.

In the prior disclosure of Yu et al., U.S. Pat. No. 3,944,631, herein incorporated by reference, it has been found that regardless of the particular emulsifier being utilized in preparing the rubber polymer latex, its polymerization in large scale commercial equipment is greatly facilitated by introducing the monomer charge to the system in several portions over a period of from 1 to 3 hours. Thus, where this is not done and the total monomer charge is introduced in one portion, the resulting exothermic polymerization reaction often becomes virtually uncontrollable leading to overheating which, in turn, may set up, i.e., coagulate, the resulting polymer latex. However, by dividing the monomer charge and introducing it in about several portions, the resulting polymerization reaction remains controllable and overheating and coagulation can be prevented. An initiator is also present in the emulsion in an amount ranging from about 0.0005 to 2 percent by weight of the (meth)acrylate monomer. Suitable for use are water soluble peroxidic compounds, e.g., hydrogen peroxide and alkali metal and ammonium persulfates, oil soluble organic peroxides and azo compounds, e.g., benzoylperoxide, azobisisobutylronitrile and the like, used singly or in combination. Redox catalysts, e.g., mixtures of peroxidic catalysts with reducing agents, such as hydrazine, alkali metal bisulfites, thiosulfates, and hydrosulfites, and soluble oxidizable sulfoxyl compounds can also be used. Preferred as the initiator herein is ammonium persulfate.

A chain transfer agent as an alkyl mercaptan, e.g., t-dodecyl mercaptan, toluene, xylene, chloroform, halogenated hydrocarbons an the like may also be used. A buffer to adjust the pH may be used.

The next step in the preferred embodiment of preparing the interpolymers used herein is the emulsion polymerization of a mixture of vinyl aromatic monomers, e.g., styrene or styrene and acrylonitrile, in the presence of minor portion of at least one difunctional or polyfunctional crosslinking monomer to form, for example, a crosslinked styrene homopolymer or styrene-acrylonitrile co-polymer. This emulsion polymerization is carried out in the presence of the crosslinked (meth)acrylate rubbery phase by adding the styrene or styrene-acrylonitrile charge to the previously prepared aqueous emulsion of crosslinked (meth)acrylate rubbery phase. The amount of styrene or styrene-acrylonitrile which is added ranges from about 60 to about 10, preferably from about 50 to about 20 percent based upon the weight of the final product which will be formed. When present, (meth)acrylonitrile preferably comprises from about 15 to about 45 parts by weight to, correspondingly, about 85 to about 55 parts of vinyl aromatic monomer.

The monomer charge of styrene-acrylonitrile, when such a combination is used, can comprise from about 55:45 to about 85:15 weight parts of styrene to acrylonitrile with the most preferred ratio being about 76:24. If desired, minor amounts, e.g., below about 20 percent by weight, of optional monomers can be included. Examples are t-butyl styrene, p-chlorostyrene, alpha-methylstyrene, methyl methacrylate, alkyl acrylate vinylidene chloride, ethylene, propylene, isobutylene and other ethyleneically compounds copolymerizable with styrene and styrene-acrylonitrile.

The crosslinking agent, emulsifiers, initiators and chain transfer agents discussed in the previous step can also be used in this step in the same amounts to form the interpenetrating crosslinked styrene-acrylonitrile resin phase associated with the rubbery phase.

Other additives can be used such as conventional light, thermal and ultraviolet light stabilizers, flame retardants, antioxidants, dyes, pigments, mineral additives and extending fillers and reinforcing agents.

DESCRIPTION OF THE PREFERRED EMBODIMENTS

The following examples show preferred embodiments of the compositions and processes of the claimed invention and the products formed therefrom. They are illustrative and are not intended to limit the claims in any way whatsoever.

The polyetherimide ester elastomer and the rubbery multistage interpolymer modifier can be combined in the desired proportions by conventional means as by mixing, blending or extrusion under conditions of sufficient heat, shear and pressure to provide a relatively uniform or mixture. The resulting low modulus elastomer product may be fabricated into finished products, also by conventional means such as injection or compression molding. All of the foregoing patents and applications are incorporated herein by reference. In the following examples, given without limitation, all parts are by weight unless otherwise specified.

Preparation of Copolyetherimide Ester

A polyetherimide ester copolymer may be made by reacting 27 parts by weight 1,4-butanediol, 34 parts by weight dimethyl terephthalate and 39 parts by weight of a polyoxyalkylene diimide diacid prepared by the imidization of trimellitic anhydride and a propylene ether diamine having an average molecular weight of 2000 (e.g. Jeffamine ®D2000, available from Texaco Chemical Company). The weight ratio of diimide diacid to dimethyl terephthalate is 1.15 and the mole percent trimellitic anhydride based on the diimide diacid is 6.8 percent. A polyetherimide ester copolymer prepared in this manner has an ASTM flexural modulus of about 14,500 psi.

Preparation of XL Acrylate/XL Styrene Interpolymer

A thermoplastic elastomer comprising a crosslinked polybutyl (acrylate) and interpenetrating, crosslinked polystyrene resin phase is prepared in a five liter, three-necked flask equipped with a heating/cooling jacket, a Teflon blade agitator, a thermometer and a nitrogen purge.

The following solutions are prepared:

| Solution A: | n-butyl acrylate | 751.4 g |
| --- | --- | --- |
| | 1-3 butyleneglycol diacrylate | 1.27 g |
| Solution B: | sodium metabisulfite | 1.75 g |
| | deionized water | 27.4 g |
| Solution C: | ammonium persulfate | 4.84 g |
| | deionized water | 76.1 g |
| Solution D: | styrene | 250.6 g |
| | divinyl benzene | 2.65 g |

(55% active solution from Dow Chemical)

Into the reaction flask is charged: 3,460 g deionized water, the following emulsifying agents: 2.1 g Sipex UB sodium lauryl sulfate (from Alcolac, Inc.) and 4.2 g Aerosol A-268, a disodium sulfosuccinate (from American Cyanamid), and 14.6 g of Solution B. The flask is stirred and sparged with $N_2$ at room temperature for 30 minutes, to reduce the $O_2$ content.

Thereafter, 150.5 g of $N_2$ sparged Solution A is added. The flask contents are heated to 55 degrees C. and then 13.5 g solution C is added to initiate polymerization.

After 1.5 hours of reaction, a sample shows 4.1% resin solids indicating approximately 96% percent conversion. The remainder of Solution A as well as 14.6 g Solution B and 40.4 g solution C are added. After 2.5 hours of additional reaction time at 55 degrees C., a sample shows 17.2 percent resin solids, indicating greater than 97 percent conversion.

The reaction mixture is cooled to 35 degrees C. and Solution D is added and mixed for 15 minutes at 35 degrees C. The reaction mixture is then heated to 60 degrees C. and the remainder of Solution C is added. The mixture was reacted for 1.25 hours. The temperature is raised to 75 degrees C. and maintained for 45 minutes. A final sample shows 22.4 percent resin solids indicating a conversion greater than 98 percent.

The product latex is coagulated in a solution of 0.25 weight percent CaCl₂ in methanol at a rate of 1600 ml methanol per 800 ml latex. The coagulum is filtered, rinsed with fresh methanol, and dried in a vacuum oven at 60 degrees C.

The product has a rubber content of 75% by weight, a number average latex particle diameter of 211 nanometers, a swell index in methyl ethyl ketone (MEK) of 8.1 and a percent gel fraction from MEK extraction of 91.1 percent.

Preparation of XL acrylate/XL SAN

A thermoplastic elastomer comprising a crosslinked poly(butyl acrylate) rubbery phase and a crosslinked poly(styrene-co-acrylonitrile) resin phase is prepared according to the method of the previous preparation except that 30 weight percent of the styrene is replaced with acrylonitrile and 70 weight percent styrene monomers are used in Solution D.

EXAMPLES 1-7

Compositions indicated by Table 1 were prepared by combining a polyetherimide ester copolymer, as prepared above, and multistage interpolymer identified as XL acrylate/XL styrene. This interpolymer is a crosslinked butyl acrylate which is interpenetrated by a crosslinked polystyrene, as prepared above. Shore hardness and tensile properties are indicated in the table. None of the elastomer blends of the invention exhibited evidence of delamination or phase separation as might be expected for blends of rubbery components.

EXAMPLE 8

Table 2 describes a 50:50 blend of polyetherimide ester and a multistage interpolymer designated XL acrylate/XL SAN. This interpolymer was prepared in a manner similar to the XL acrylate/XL styrene interpolymer except that the second stage was comprised of a crosslinked styrene-acrylonitrile copolymer.

TABLE 1

| Composition (pbw) | 1* | 2 | 3 | 4 | 5 | 6 | 7* |
|---|---|---|---|---|---|---|---|
| polyetherimide ester | 100 | 75 | 55 | 50 | 45 | 25 | 0 |
| XL acrylate/XL styrene | 0 | 25 | 45 | 50 | 55 | 75 | 100 |
| Properties | | | | | | | |
| Shore A Hardness | 97 | 94 | 92 | 91 | 88 | 79 | 58 |
| Shore D Hardness | 43 | 34 | 28 | 27 | 24 | 18 | — |
| Tensile Elongation % | 190 | >500 | >500 | 450 | >500 | >500 | >500 |
| Tensile Strength psi | 2100 | 2100 | 1700 | 1000 | 1500 | 1000 | 700 |

*Comparative

TABLE 2

| Composition pbw | 8 |
|---|---|
| polyetherimide ester | 50 |
| XL acrylate/XL SAN | 50 |
| Properties | |
| Shore A Hardness | 92 |
| Shore D Hardness | 28 |
| Tensile Elongation % | 530 |
| Tensile Strength psi | 1000 |

EXAMPLES 9-20

Tables 3 and 4 demonstrate the effect of various additives in 50:50 elastomer blends of polyetherimide ester and crosslinked acrylate/crosslinked styrene interpolymer. The tables describe blends containing 10 and 20 part by weight loadings of silica, clays, talc and glass. A blend with 30 parts glass is also shown. The data clearly indicates the feasibility of providing filled elastomeric blends of polyetherimide ester and crosslinked acrylate/crosslinked styrene interpolymer.

TABLE 3

| Composition | 9* | 10 | 11 | 12 | 13 | 14 | 15 |
|---|---|---|---|---|---|---|---|
| Polyetherimide ester | 50 | 50 | 50 | 50 | 50 | 50 | 50 |
| XL acrylate/XL styrene | 50 | 50 | 50 | 50 | 50 | 50 | 50 |
| silica⁽ᵃ⁾ | — | 10 | 20 | — | — | — | — |
| clay⁽ᵇ⁾ | — | — | — | 10 | 20 | — | — |
| clay⁽ᶜ⁾ | — | — | — | — | — | 10 | 20 |
| Properties | | | | | | | |
| Tensile Strength (Kpsi)⁽ᵈ⁾ | 1.16 | 1.12 | 1.02 | 1.15 | 1.09 | 1.22 | 1.26 |
| Tensile Elongation %⁽ᵈ⁾ | 422 | 331 | 292 | 348 | 225 | 356 | 213 |
| Shore A Hardness | 89 | 90 | 91 | 90 | 92 | 89 | 88 |
| Shore D Hardness | 27.2 | 27 | 28 | 27 | 29 | 26 | 29 |
| Dynatup Impact (−30 C.) | | | | | | | |
| Total Energy (ft. lb.)⁽ᵉ⁾ | 29D | 33D | 31D | 31D | 28B | 32D | 27B |
| Max Energy (ft. lb.) | 17 | 20 | 19 | 18 | 19 | 19 | 20 |
| Compression Set % | 30 | 29 | 29 | 24 | 27 | 29 | 30 |

Notes:
*Comparative
⁽ᵃ⁾Imsil A10 silica
⁽ᵇ⁾Satintone Whitex Clay
⁽ᶜ⁾Translink 445 Clay
⁽ᵈ⁾2 inch minimum
⁽ᵉ⁾D = ductile failure, B = brittle failure

TABLE 4

| Composition | 16 | 17 | 18 | 19 | 20 |
|---|---|---|---|---|---|
| Talc⁽ᵃ⁾ | 10 | 20 | — | — | — |
| glass (¼" chopped) | — | — | 10 | 20 | 30 |
| Properties | | | | | |
| Tensile Strength (Kpsi)⁽ᵇ⁾ | 1.14 | 1.12 | 1.10 | 1.56 | 1.95 |
| Tensile Elongation % | 304 | 201 | 258 | 122 | 37 |
| Shore A Hardness | 88 | 90 | 90 | 90 | 93 |
| Shore D Hardness | 27 | 29 | 30 | 33 | 36 |
| Dynatup Impact | | | | | |

TABLE 4-continued

| Composition | 16 | 17 | 18 | 19 | 20 |
|---|---|---|---|---|---|
| (−30 C.)(c) | | | | | |
| Total Energy (ft. lb.) | 29D | 24B | 9B | 8B | 10B |
| Max Energy (ft. lb.) | 18 | 17 | 9 | 2 | 4 |
| Compression Set % | 26 | 27 | 24 | 27 | 28 |

Notes:
(a)Pfizer MP4526 talc
(b)2 inch minimum
(c)D = ductile failure, B = brittle failure

We claim:

1. A molded thermoplastic elastomer article comprising:
   A.) a polyetherimide ester copolymer; and
   B.) a modulus reducing amount of a rubbery interpolymer comprising a crosslinked alkoxyalkyl (methy)acrylate rubbery phase and an emulsion polymerized crosslinked styrene-acrylonitrile copolymer phase interpenetrating said alkoxyalkyl(meth-)acrylate rubbery phase to form an integral rubbery interpolymer whereby said thermoplastic elastomer article has enhanced delamination resistance: wherein said polyetherimide ester copolymer is the reaction product of (a) one or more diols having from 2 to 8 carbon atoms; (b) one or more dicarboxylic acids having a molecular weight of less than about 300; and (c) one or more polyoxyalkylene diimide diacids and wherein said styrene-acrylonitrile comprises from about 55:45 to about 85:15 weight parts of styrene to acrylonitrile.

2. The article of claim 1 wherein the diol component (a) is 60 to 100 mole percent 1,4-butanediol.

3. The article of claim 1 wherein the dicarboxylic acid component (b) is from 60 to 100 mole percent dimethyl terephthalate.

4. The article of claim 1 wherein the polyoxyalkylene diimide diacid component (c) is derived from one or more polyoxyalkylene diamines and one or more tricarboxylic acid compounds containing two vicinal carboxyl groups or an anhydride group and an additional carboxyl group, and is characterized by the following formula:

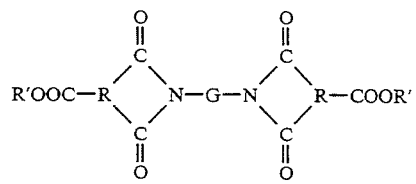

wherein each R is independently selected from the group consisting of $C_2$ to $C_{20}$ aliphatic and cycloaliphatic trivalent organic radicals and $C_6$ to $C_{20}$ aromatic trivalent organic radicals; each R' is independently selected from the group consisting of hydrogen, $C_1$ to $C_6$ aliphatic and cycloaliphatic monovalent organic radicals and $C_6$ to $C_{12}$ aromatic monovalent organic radicals, and G is the radical remaining after removal of the hydroxy groups of a long chain ether glycol having an average molecular weight of from about 600 to 12000.

5. The article of claim 4 wherein the polyoxyalkylene diimide diacid is derived from trimellitic anhydride and a polyoxyalkylene diamine selected from the group consisting of polypropylene oxide diamine and a copoly(ethylene oxide-propylene oxide)diamine having predominantly polyethylene oxide in the backbone.

6. The article of claim 1 wherein the polyetherimide ester copolymer is present in an amount of, approximately, 5 to 95 parts by weight and correspondingly, the rubbery interpolymer is present in an amount of, approximately 95 to 5 parts by weight, based upon 100 parts by weight of both polymers taken together.

7. The article of claim 6 comprising 20 to 80 parts by weight polyetherimide ester and correspondingly 80 to 20 parts by weight rubbery interpolymer based upon 100 parts by weight of both polymers taken together.

* * * * *